A. Whiteley,
Band Pulley,
N° 12,802.    Patented May 1, 1855.

UNITED STATES PATENT OFFICE.

ABNER WHITELEY, OF CLARK COUNTY, OHIO.

ARRANGING SHAFTS AND PULLEYS AT AN ANGLE.

Specification of Letters Patent No. 12,802, dated May 1, 1855.

*To all whom it may concern:*

Be it known that I, ABNER WHITELEY, of the county of Clark and State of Ohio, have invented a new and useful Improvement in Arranging the Bearings of Driving-Pulleys and Gear-Wheels with their Axis of Motion Oblique to the Shaft which Drives Them; and I do hereby declare that the following is a full, clear, and exact description of the construction and operation of the same, reference being had to the annexed drawings, making a part of this specification.

This improvement consists in a cheap and convenient mode of arranging the bearings of shafts and pulleys or gear wheels when their axes of motion form a fixed angle with each other.

Modes of communicating motion for axes which are variable in direction with respect to each other are well known but my improvement relates to a simple arrangement when such motion is to be given to axes having a constant and fixed angle.

Figure 1:
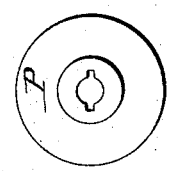
Figure 1:
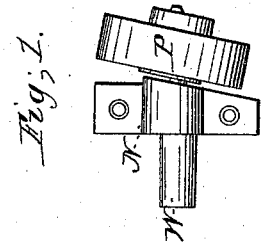
Figure 2:
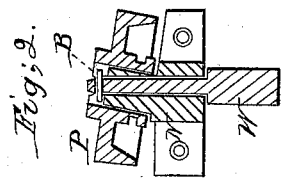

In the accompanying drawings Figure 1 is a top plan view and Fig. 2, a section of the parts.

P, is a pulley having the bore or hole in the center larger on one side than on the other. The larger part of said bore extends through that portion of the hub which is included between the planes of the sides of said pulley, P, and that portion of the hub which extends beyond the plane on one side has the smaller bore in it leaving that portion of the hub included between the size of the holes in that end of the hub, in this there is a slot cut across the center the ends of which extend as far as the outside of the larger bore.

W, is a shaft the smaller part of which passes through the box, N, and is the journal this part extends through the box and stud on the box and there is a hole in it just outside of where a line drawn at right angles to its center will clear the end of said stud in this hole there in a pin, B, whose length is not quite equal to the diameter of the larger part of the bore in the pulley P.

N, is a box and has a stud on one side of it and a hole extending through it and the stud. The centers of the hole and stud are in a plane parallel with the faces of the box, N, but the planes that pass through their centers and at right angles to the faces of the box, N, are inclined to each other and when the shaft, W, is passed through the hole in box, N, and the end brought to its place, these planes meet or cross each other in the centers of said hole in shaft, W, when it is placed in range or parallel with them; said stud is of the same size as the larger part of the bore in said pulley, P, which fits on to it and the smaller part of the bore is a little larger than the journal on shaft, W, and the inside and outside edges or corners at the ends of the smaller part of said bore are removed leaving only a small portion in the center where the pin works. This is necessary on account of the obliquity of the axis of the shaft, W, to the axis of motion of the pulley, P, when working on the stud, and when it is desired to drive another shaft instead of the pulley, P, the coupling on the end of the shaft should be made to take the place of the hub of the pulley, P.

The operation of this improvement is as follows—the end of the shaft, W, being passed through the box, N, and stud and the pin, B, put in the hole in shaft, W, as described and the pulley, P, being placed on the stud the pin, B, enters the slot in the end of the hub and when motion is communicated to the shaft, W, the pin, B, passing through it and its ends extending into the slot in the hub of pulley, P, the pin, B, takes hold of the pulley, P, and causes it to turn around as the shaft, W, is turned around while its axis of motion is oblique to the shaft, W, which drives it.

I do not claim communicating motion when the axes form an angle with each other by means of a cross head or pin attached to one axis moving within grooves or slots attached to the parts of the other axes or pulley as that is well known; but What I do claim as my invention and desire to secure by Letters Patent is—

The above described mode of arranging the bearings consisting of the stud or projection from the bearing of one shaft which stud is a bearing for the pulley, gear wheel, or coupling of the other revolving part and through which the axis having the pin passes, for the purpose of forming a secure and compact adjustment of the parts when the respective axes of motion have a fixed and invariable angle with each other.

In testimony whereof I have subscribed my name before two subscribing witnesses.

ABNER WHITELEY.

Witnesses:
CHS. P. WANNAU,
JNO. H. JOHNSON.